United States Patent [19]

Simon

[11] Patent Number: 4,592,127
[45] Date of Patent: Jun. 3, 1986

[54] METHOD FOR SECURING THE COMPONENTS OF A DECORATIVE MOLDING SYSTEM

[75] Inventor: Melvin L. Simon, Concord, Tenn.

[73] Assignee: Vinylex Corporation, Knoxville, Tenn.

[21] Appl. No.: 587,169

[22] Filed: Apr. 26, 1984

Related U.S. Application Data

[62] Division of Ser. No. 305,616, Sep. 25, 1981, Pat. No. 4,463,539.

[51] Int. Cl.⁴ .............................................. B23P 11/02
[52] U.S. Cl. ......................................... 29/451; 29/453
[58] Field of Search .................... 29/453, 451, 155 R; 52/716–718; 293/1, 128

[56] References Cited

U.S. PATENT DOCUMENTS

| | | | |
|---|---|---|---|
| 1,972,283 | 9/1934 | Zimmers | 52/718 X |
| 2,889,165 | 6/1959 | Zientara | 293/1 |
| 3,290,082 | 12/1966 | Fritsch | 293/128 |
| 3,388,523 | 6/1968 | Evans | 293/128 X |
| 3,451,709 | 6/1969 | Swauger | 293/128 |
| 3,506,294 | 4/1970 | Newman | 293/1 |
| 3,606,431 | 9/1971 | Kunevicius | 293/128 |
| 3,606,432 | 9/1971 | Honatzis | 293/128 |
| 3,752,521 | 8/1973 | Lafebre | 293/1 |
| 3,991,537 | 11/1976 | Brown | 52/717 |
| 4,015,760 | 4/1977 | Bott | 293/1 |
| 4,066,285 | 1/1978 | Hall et al. | 293/128 |
| 4,083,592 | 4/1978 | Rubin et al. | 52/716 |
| 4,220,365 | 9/1980 | Foster et al. | 293/128 |

Primary Examiner—Charlie T. Moon
Attorney, Agent, or Firm—Luedeka & Neely

[57] ABSTRACT

A method and apparatus are provided for applying a unitary molding system to a mounting surface. The molding system includes a channel member having a pair of opposed longitudinal ribs interconnected by an adhesive-backed web. A decorative trim member is secured between the ribs. The ribs and trim member terminate at locations inboard of the web. An end tip having an exposed portion and an inserted portion engages the trim member and channel member, thus securing the end tip in spaced relation with the mounting surface.

3 Claims, 4 Drawing Figures

METHOD FOR SECURING THE COMPONENTS OF A DECORATIVE MOLDING SYSTEM

This application is a division of application Ser. No. 305,616 filed Sept. 25, 1981 which has issued as U.S. Pat. No. 4,463,539.

The present invention relates generally to decorative molding systems for vehicles, and specifically to means and method for securing the components of a decorative molding system attached to a mounting surface by means of adhesive.

A decorative molding system for vehicles commonly consists of three main components: a channel member including a pair of opposed longitudinal ribs interconnected by a web, a resilient decorative trim member secured between the two ribs, and an end tip securing the ends of the channel and trim members. The molding system is usually attached to its mounting surface by metal rivets that extend through holes drilled through the web and the mounting surface. The channel member and trim member are manufactured in long lengths, but at the retail level they are cut by ordinary mechanics to fit a particular mounting surface, the length of which varies from one vehicle to another and from one section of a vehicle to another. The end tip further serves as a decorative means of terminating the ends of the channel and trim members without exposing the rough ends thereof.

One problem encountered with decorative molding systems is that the means of securing the components together and of attaching the molding system to its mounting surface incur undesirable corrosion due to chemical interaction between dissimilar metals. Initially, the channel member was usually made of metal and was attached to its mounting surface by metal rivets. The metal rivets are still the prevalent means of mounting the channel member upon the mounting surface, despite the attendant problems. Both the metal channel member and the metal rivets tend to corrode as a consequence of their contact with a dissimilar metallic mounting surface. Attempts were made to alleviate this undesirable interaction by manufacturing the channel member from plastic and by using an adhesive backing in lieu of rivets as a means of securing the channel member to the mounting surface. However, the end tip is still often made of metal due to manufacturing economy and visual appeal, and thus it is vulnerable to the aforesaid corrosion attack when it is in contact with the mounting surface. Adhesive layers have been interposed between the end tip and the mounting surface to secure the tip and alleviate the corrosion problem. However, such adhesive layers have not adequately secured the end tip to its mounting surface. Consequently, rivets remain the primary means for attaching end tips.

For aesthetic reasons, it is desirable that the end tip be secured in longitudinal alignment with the channel and trim members. Prior systems have used end tips including an exposed portion comprising a metal core encapsulated by plastic and an inserted portion comprising a metal core with a series of barbed rings. The end tip is maintained in longitudinal alignment with the channel and trim members by frictional engagement of the barbed metal core between the web of the channel member and the base of the decorative trim member. This system is undesirable because the end tip is designed to contact the mounting surface. Such contact can create corrosion for a metallic end tip, and impacts to the tip can cause chipping of the protective paint surface. Also, the exposed portion of the end tip is disposed directly upon the mounting surface completely outboard of the channel member such that any lateral force applied to the end tip by an external device, such as a car wash, is fully transmitted to the inserted portion of the end tip. This transmitted lateral force tends to misalign or dislodge the end tip from its secured position. Further, the end tip does not independently secure each of the channel and trim members. Thus, misalignment or disengagement of the end tip can occur upon any slight movement of the trim member relative to the channel member.

Still another problem with decorative molding systems inheres in the fact that the overall length of the molding system is generally equivalent to the length of the mounting surface, but the channel member is shorter in order to compensate for the end tips. Thus, installation requires a subtraction step to determine the proper length for the channel member. Installation of prior decorative molding systems requires measurement of the desired length of the mounting surface to be covered by the molding system. From this measurement is subtracted the distance by which the exposed portion of the end tip is disposed outboard of the channel member, thereby arriving at the length to which the channel member must be cut. If an identical end tip is to be used on each end of the channel member, twice the length of the exposed portion of an end tip must be subtracted from the desired length of the mounting surface to be covered. This subtraction step often results in an excessive channel member length which must be shortened. This extra step delays the time of installation. Sometimes the channel member is cut too short, in which case a new channel member should be cut. If the short channel member is used, it will leave an exposed area on the mounting surface.

It is thus an object of the present invention to provide an improved decorative molding system. It is also an object to provide a decorative molding system in which the trim and channel members are secured by an end tip maintained in spaced relation to the mounting surface to avoid damage and corrosion of the surface. It is a further object to provide an improved means for aligning and engaging an end tip with a channel member and a trim member. It is a further object to provide a method of installing a decorative molding system involving fewer steps of measurement.

Further objects and advantages will become apparent through reference to the description and accompanying drawings in which.

Figure 1:
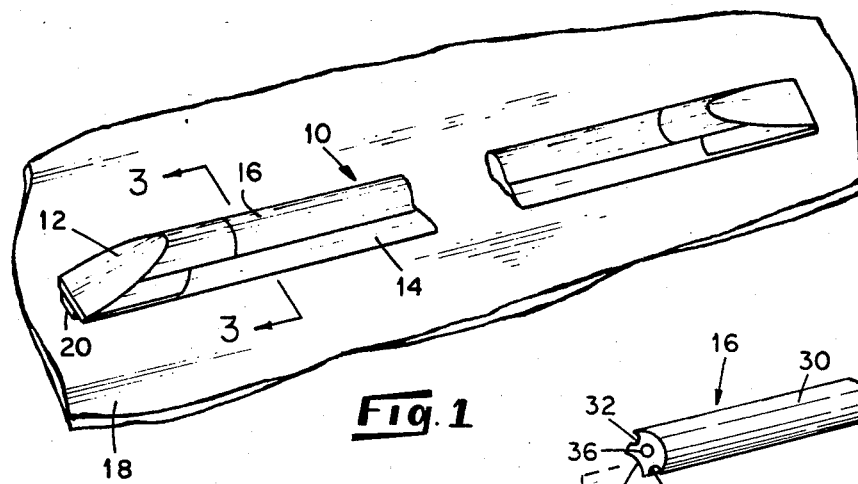
FIG. 1 is a perspective view of a fully-assembled decorative molding system embodying various features of the present invention.
Figure 2:
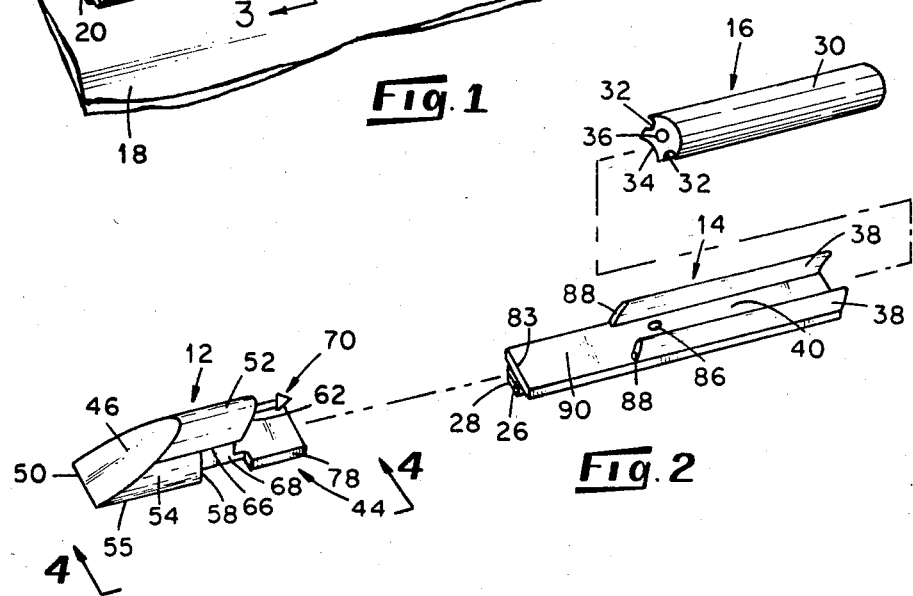
FIG. 2 is perspective view of an expanded half assembly of the decorative molding system shown in FIG. 1.

Generally, in accordance with the present invention a channel member having a web and a pair of opposed longitudinal ribs includes an adhesive backing. An elongated trim member is secured between the opposed ribs in spaced relation with the web. The ribs and trim member terminate at a location inboard of the end of the web. An end tip comprising an exposed decorative portion and an inserted portion includes securing means adapted to engage the trim member and channel member to secure the end tip upon the web.

Referring to the drawings, there is depicted a decorative molding system 10 comprising an end tip 12, a channel member 14 and a resilient decorative trim member 16. Means are provided for securing the decorative molding system 10 as a unit to a mounting surface 18. In the embodiment illustrated, an adhesive backing 20 is permanently glued to a bottom face 22 of the channel member 14 and is disposed along the entire longitudinal length of channel member 14, recessed slightly inward of a pair of opposed edges 24 of channel member 14. An adhering face 26 of the adhesive backing 20 is releasably secured to a release film 28 disposed along the entire area of the adhesive backing 20. The adhering face 26 is provided with a contact adhesive, and the release film 28 serves to protect the bonding ability of the adhering face 26 until installation is required. The release film 28 is removable at installation, and the adhering face 26 is adapted to be pressed against the mounting surface 18, thereby securing the decorative molding system 10 to the mounting surface 18.

The resilient trim member 16, which provides the primary protective function of absorbing impacts directed toward the mounting surface, has a longitudinal convex exposed surface 30, a longitudinal concave base 34 and a pair of opposed longitudinal grooves 32 defined between the exposed surface 30 and the base 34. A longitudinal bore 36 having a diameter of about ⅛ inch is defined within the trim member 16.

The channel member 14 comprises a rigid vinyl, for example, and includes a pair of longitudinal ribs 38 secured in spaced relation to each other by a web 40 extending the full length of the channel member 14. In the depicted embodiment each of the ribs 38 is about 3/16 inch in width, and the ribs curve arcuately toward one another.

The end tip 12 comprises an exposed decorative portion 42 and an inserted end portion 44. The exposed decorative portion 42 comprises an inclined face 46 intersecting a base 48 at an edge 50 at an angle of about 30°, a convex surface 52 contoured to substantially match the contour of the longitudinal convex surface 30 of the trim member 16, and a pair of opposed side convex surfaces 54 contoured to substantially match the convex exposed contour of the longitudinal ribs 38 of the channel member 14. The inclined face 46 is bordered on its outboard end by the edge 50 and elsewhere by edges formed by the intersection of the face 46 with the surfaces 52 and 54. Edges 55 and 58 are defined by the intersection of the side surfaces 54 with the base 48 and a pair of coplanar shoulders 56, respectively. The side convex surfaces 54 are bordered by the edges 55 and 58 and by edges defined by the intersection of the surfaces 54 with the face 46 and the surface 52. The convex surface 52 is bordered by edges formed by its intersection with a face 60, said face 60 being disposed perpendicular to the longitudinal axis of the end tip 12 and defining a curved edge 62 along the intersection of the surface 52 and the face 60, with the face 46 and the surfaces 54, and with a pair of coplanar shoulders 64. The shoulders 64 are disposed parallel to the longitudinal axis of the end tip 12. A pair of longitudinally-aligned opposed edges 66 are defined at the intersection of the surface 52 and the shoulders 64. The base 48 is longitudinally disposed commencing at the edge 50 and terminating at a plane coincident with the shoulders 56.

Figure 4:
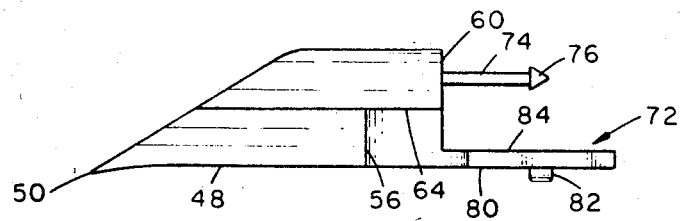
FIG. 4 is a side elevation view taken along line 4—4 in FIG. 2.

The inserted end portion 44 is formed integral with the exposed portion 42 extending longitudinally therefrom. The inserted portion 44 is adopted to matingly engage with the trim member 16 and channel member 14. The inserted portion 44 includes an engagement rod 70 and a base 72, which is about ½ inch wide, about ½ inch long and about 1/16 inch thick. The engagement rod 70 comprises a longitudinally-disposed cylindrical shaft 74 attached at one end to the face 60 and an integral conical barb 76 at the opposite end of the shaft 74. The apex of the barb 76 is the leading point of the engagement rod 70. The depicted base 72 comprises a pair of opposed longitudinal side walls 78, a top face 84, an opposed bottom surface 80, and an attachment member 82 attached to the base 72 at a location approxixately the center of the base 72. The attachment member 82 extends outwardly from the surface 80, substantially perpendicular to the longitudinal axis of the end tip 12, i.e., downward as shown in FIG. 4. The inserted end portion 44 further includes a pair of opposed longitudinally-aligned faces 68, recessed inward of the opposed edges 66 and intersecting the shoulders 56 and 64.

The channel member 14 is adapted to receive thereupon the full length of the exposed portion 42. The ribs 38 terminate inboard of the web end 83 by a distance equal to the length of the base 48, thus defining an enlarged web face 90 at the end of the channel member 14. The web 40 defines a cavity 86 located inboard of a pair of ends 88 of the ribs 38 by a distance equal to the longitudinal distance between the shoulders 56 and the attachment member 82. The cavity 86 is sized to allow insertion of the attachment member 82 and has a depth greater than the length of the member 82 to prevent contact between the member 82 and the mounting surface 18.

As depicted in FIG. 1, the decorative molding system 10 is adapted to be secured so that only its decorative exposed surfaces are viewable from a position above the mounting surface 18 and so that each of the components of the docorative molding system 10 are maintained in longitudinal alignment.

Means are provided for independently securing the end tip 12 to the channel member 14. The longitudinal ribs 38 of the channel member 14 are adapted to receive in interference fit therebetween the opposed side walls 78 of the base 72 of the end tip 12, thereby restricting longitudinal motion of the end tip 12 relative to the channel member 14 and also providing improved longitudinal alignment between the end tip 12 and the channel member 14. Although the embodiment depicted in the various drawings illustrates the top face 84 of the base 72 as parallel to the bottom surface 80, it is understood that in an alternate embodiment the top face 84 inclines upwardly to the left as viewable in FIG. 4, making the base 72 wedge-shaped. Thus, insertion of the base 72 between the opposed ribs 38 increasingly engages the ribs 38 in frictional interference as the base 72 is progressively inserted between said ribs, thereby further constraining the end tip 12 and the channel member 14 from relative longitudinal movement. The attachment member 82 of the base 72 of the end tip 12 is adapted to be received into the cavity 86 of the web 40, thereby constraining the end tip 12 from longitudinal motion relative to the channel member 14 when the tip 12 is fully inserted.

The distance between the longitudinally-aligned faces 68 of the inserted portion 44 is generally equivalent to the distance between the ribs 38 of the channel member 14 at their inboard edges, thus allowing full insertion of the faces 68 between the ribs of the channel member 14. Also, the longitudinally-aligned shoulders 64, shown horizontal in FIG. 4, are disposed a distance above the bottom surface 80 of the inserted portion 44 such that upon insertion of the end tip 12 into the channel member 14 the shoulders 64 are located just above the ribs 38 of the channel member 14.

When the end tip 12 is fully inserted into the channel member 14 and the attachment member 82 is received into the cavity 86, the edges 58 of the side convex surfaces 54 are disposed in contact with the ends 88 of the ribs 38 of the channel member 14, thus presenting a smooth decorative outer contour at the edges 58. Similarly, the edges 66 of the convex surface 52 contact the longitudinal edges of the ribs 38, presenting a smooth decorative outer contour along the edges 66. The enlarged web face 90 is of substantially the same dimensions as the base 48 of the exposed portion 42 of the end tip 12. Consequently, the edge 50 of the end tip 12 is disposed flush with the outermost longitudinal end 83 of the channel member 14, and the entirety of the end tip 12 is secured in spaced relation to the mounting surface 18. The end tip presents a smooth decorative contour at the end of the molding system and avoids the possibility of paint chipping due to impacts and corrosion due to dissimilar metal contact between the end tip 12 and the mounting surface 18. The web 40 is disposed in contact with the exposed portion 42 adjacent the end thereof to provide stiffness and resist any external lateral forces applied to the molding system 10 near its longitudinal end at a location close to the mounting surface 18.

Means are provided for independently securing the end tip 12 to the trim member 16. The longitudinal grooves 32 of the trim member 16 are adapted to be slidably received into the longitudinal ribs 38 of the channel member 14. The engagement rod 70 of the end tip 12 is adapted to be longitudinally received into the longitudinal bore 36 of the resilient trim member 16. The base dimension of the conical barb 76 of the engagement rod 70 is of slightly larger diameter than that of the longitudinal bore 36, effecting an interference fit opposing relative longitudinal motion between the end tip 12 and the trim member 16. Although only one conical barb 76 is depicted on the engagement rod 70, it is understood that additional longitudinal alignment and frictional force can be obtained in an alternate embodiment by disposing a plurality of conical barbs along the axis of the engagement rod 70. In another embodiment, it is understood that the barb 76 need not be conical to effect an interference fit with the bore 36. For example, the barb 76 may be cylindrical in shape. At full engagement of the engagement rod 70 into the trim member 16, the trim member 16 is disposed in contact with the face 60 of the end tip 12, thus presenting a smooth decorative contour at the intersection of the convex exposed surface 30 of the trim member 16 and the convex surface 52 of the end tip 12.

Figure 3:
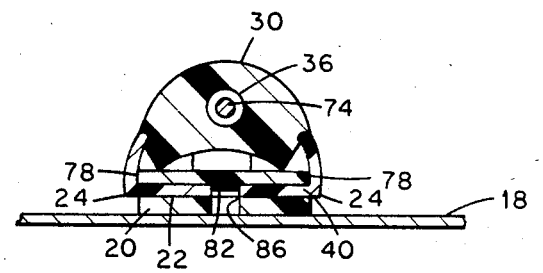
FIG. 3 is a sectional elevation view taken along line 3—3 in FIG. 1.

As illustrated in FIG. 3, the base 34 of the trim member 16 is spaced away from the web 40 by a distance sufficient to allow full insertion of the base 72 between the ribs 38 in frictional contact with the trim member 16.

Means are provided to urge the edge 50 of the end tip 2 into contact with the enlarged web face 90 of the channel member 14. As shown in FIG. 4, the base 48 of the exposed portion 42 is disposed slightly lower than the bottom surface 80 of the inserted portion 44. When the base 72 is inserted into the channel 14, the ribs 38 urge the edge 50 into contact with the enlarged web face 90 to oppose any external forces that would otherwise tend to dislodge the end tip 12 from its secured position.

In the depicted embodiment, the flush mounting of the end tip 12 and the channel member 14 at the longitudinal extremity of the molding system allows the installer to cut the channel member 14 to a length substantially equal to that of the mounting surface desired to be covered by the molding system. There is no need to reduce the length to account for end tips extending beyond the channel member.

To install the decorative molding system 10 the mounting surface 18 is measured to determine the desired length to be covered. The channel member 14 is cut on each end substantially perpendicular to its longitudinal axis such that the cut length of the channel member 14 substantially equals that of the mounting surface desired to be covered. The ribs 38 are cut flush to the web 40 longitudinally inward from each end 83 of the channel member 14 a distance equal to the length of the edges 55, thus defining the enlarged web face 90 situated at each end of the channel member 14. The ribs 38 are cut substantially perpendicular to the longitudinal axis of the channel member 14, thus defining the ends 88. A portion of the web 40 is removed, as with a punch, to define the cavity 86 at a distance from the end 83 of the channel member 14 substantially equal to the distance between the edge 50 and the attachment member 82 of the end tip 12. In one embodiment, the end tip 12 is inserted into each end of the channel member 14 by sliding the base 72 between the ribs 38. The side walls 78 of the base 72 engage the inner surfaces of the ribs 38 in an interference fit. At full insertion of the end tip 12, the attachment member 82 of the base 72 is received into the cavity 86. Once the end tips are fully inserted at each end of the channel member 14, the desired length of the trim member 16 is determined by measuring the distance between the faces 60 and increasing the length by about ten percent to account for the normal shrinkage. The trim member 16 is cut on each end substantially perpendicular to its longitudinal axis, such that the cut length of the trim member 16 substantially equals or exceeds by up to approximately ten percent the distance between the faces 60 of the two opposed inserted end tips 12. The resilient trim member 16 is installed by pressing one of its ends between the ribs 38 until the upper edges of the ribs extend into the longitudinal grooves 32. Approximately simultaneously, the trim member 16 is urged toward the end tip 12. The engagement rod 70 engages the longitudinal bore 36 of the trim member 16 in an interference fit, since the base dimension of its conical barb 76 is slightly greater than the diameter of the bore 36. The base 34 of the trim member 16 engages the top face 84 of the base 72 in frictional interference. The resilient trim member 16 is then bent into an arc, and its remaining free end is inserted into the second end tip 12 in the same manner used for the first end tip. The remainder of the length of the resilient trim member 16 is pressed between the ribs 38, extending the upper edges of the ribs into the longitudinal grooves 32 and urging the ends of the trim member 16 into abutting relationship with the face 60 of each end tip 12. The decorative molding system 10 is then secured to the mounting surface 18 by removing the release film 28 and pressing the adhering face 26 against the mounting surface 18. The result is a smooth decorative contour along the entire length of the decorative molding system 10, as seen in FIG. 1.

In an alternate embodiment, it is understood that the trim member 16 can be pressed into the channel member 14 prior to insertion of one or both the end tips 12 into the channel member 14. To determine the desired length of the trim member 16, the channel member 14 is used as a template to scribe or mark the distance between the ends 88 of the ribs 38 onto the trim member 16. The end tip 12 is used as a template to twice reduce the length between the scribe marks on the trim member 16 by a distance substantially equal to the distance between the shoulders 56 and the face 60 of the end tip 12. To provide a compression fit between the opposed installed end tips 12, even after shrinkage, the distance between the scribe marks on the trim member 16 is increased by up to approximately 10%. The trim member 16 is cut at the scribe marks substantially perpendicular to its longitudinal axis. The trim member 16 is then centrally positioned between the ends 88 of the ribs 38, and its longitudinal grooves 32 are pressed into the upper edges of said ribs. The end tip 12 is inserted on each end of the trim and channel members by sliding the engagement rod 70 into the longitudinal bore 36 of the trim member 16 and simultaneously sliding the base 72 between the ribs 38 of the channel member 14 until the attachment member 82 is received into the cavity 86, thus urging the face 60 into abutting relationship with the end of the trim member 16. Through steps similar to the above, the trim member can be installed subsequent to insertion of one end tip into the channel member 14 and prior to insertion of the other end tip. Thus, the two end tips and the trim member can be installed upon the channel member in any relative sequence.

The present invention provides an improved decorative molding system in which an end tip securing trim and channel members is maintained in spaced relation to a mounting surface without rivets to avoid dissimilar metal contact and chipping of a painted mounting surface due to impacts. The base of an end tip near its longitudinal end is maintained in contact with the channel member to minimize the possibility of the end tip being dislodged by contact with external devices. Installation of the molding system is simplified, because fewer measurement steps are required, and the entire system can be applied to a mounting surface as a unit. The opportunities for error are reduced substantially.

While a preferred embodiment having particularly shaped members has been shown and described herein, it will be understood that there is no intent to limit the invention by such disclosure, but rather, it is intended to cover all modifications and alternate constructions falling within the spirit and scope of the invention as defined in the appended claims.

What is claimed is:

1. A method for securing an end tip, having an exposed portion and an inserted portion, said inserted portion having an attachment member spaced-apart from said exposed portion and extending generally perpendicular to the longitudinal axis of the end tip, a channel member including a pair of longitudinal ribs extending towards each other interconnected by a web, and a resilient trim member of a unitary decorative molding system comprising:

measuring the desired length of a mounting surface;

cutting said channel member to a length substantially equivalent to said desired length of said mounting surface;

forming a cavity in said web of said channel member spaced-apart from said end by a distance substantially equal to the distance between said attachment member said exposed portion of said end tip;

inserting said ribs of said channel member into a pair of opposed longitudinal grooves defined in said trim member to secure said trim member to said channel member, said trim member being spaced-apart from said web of said channel member;

inserting said inserted portion of said end tip into said channel member between said trim member and said web and causing said attachment member to be inserted into and engaged in said cavity;

and adhesively securing said channel member to said mounting surface.

2. A method for attaching and confining a decorative trim to a mounting surface, comprising:

providing a channel member having a web, at least one cavity formed in the web, and a pair of longitudinal ribs extending toward each other formed along the longitudinal edges of the web;

fitting and securing a resilient decorative trim between said ribs at a spaced apart relation of said web;

providing an end tip with an exposed decorative portion, an elongated end portion, and an attachment member extending outwardly from the longitudinal axis of said elongated end portion;

inserting the elongated end portion between the web and the resilient decorative trim;

positioning the end tip adjacent to the ends of the pair of ribs;

inserting and positioning the attachment member in the cavity of the web to a depth of less than the thickness of the web so that the attachment member does not protrude through the web to secure the end tip to the channel member; and adhesively attaching the channel member to the support surface.

3. The method of claim 2 further comprising providing a second end tip with an exposed decorative portion, an elongated end portion, and an attachment member extending outwardly from the longitudinal axis of said elongated end portion;

inserting the elongated end portion of the second end tip between the web and the resilient decorative trim at the opposite end of the web and the decorative trim from the first end tip;

positioning the second end tip adjacent to the ends of the pair of ribs at the opposite longitudinal ends of the ribs from the first end tips; and inserting and positioning the attachment member of the second end tip in a second cavity of the web to a depth of less than the thickness of the web so that the second attachment member does not protrude through the web to secure the second end tip to the channel member.

* * * * *